US007895576B2

(12) United States Patent
Chang et al.

(10) Patent No.: US 7,895,576 B2
(45) Date of Patent: Feb. 22, 2011

(54) METHOD FOR AUTOMATING INTERNATIONALIZATION SOFTWARE TESTING

(75) Inventors: David W. Chang, San Jose, CA (US); William E. Malloy, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 11/558,514

(22) Filed: Nov. 10, 2006

(65) Prior Publication Data

US 2008/0115111 A1    May 15, 2008

(51) Int. Cl.
*G06F 9/44* (2006.01)
(52) U.S. Cl. .............................. 717/124; 717/125; 704/8
(58) Field of Classification Search .................... 704/8; 717/125
See application file for complete search history.

(56) References Cited

U.S. PATENT DOCUMENTS

| 5,450,470 A | 9/1995 | Alheim |
| 5,475,843 A | 12/1995 | Halviatti et al. |
| 5,651,111 A | 7/1997 | McKeeman et al. |
| 5,652,835 A | 7/1997 | Miller |
| 6,071,316 A | 6/2000 | Goossen et al. |
| 6,167,534 A | 12/2000 | Straathof et al. |
| 6,332,211 B1 | 12/2001 | Pavela |
| 6,374,207 B1 | 4/2002 | Li et al. |
| 6,477,483 B1 * | 11/2002 | Scarlat et al. ............... 702/186 |
| 6,697,967 B1 | 2/2004 | Robertson |
| 7,398,468 B2 * | 7/2008 | Flam .......................... 715/264 |
| 2001/0013116 A1 | 8/2001 | Watanabe et al. |

* cited by examiner

*Primary Examiner*—Wei Y Zhen
*Assistant Examiner*—Phillip H Nguyen
(74) *Attorney, Agent, or Firm*—Cantor Colburn LLP; Steven Kurlowecz

(57) ABSTRACT

An embodiment of the present invention relates to a method that provides for an effective way of creating and maintaining test scripts. In this regard, the application under test (AUT) software objects are abstracted in a mapping, verification points (VP) are created, and actions are scripted. The mapping is independent of the language. Objects in the scripts are mapped to the actual objects in the application under test (AUT). The actions are scripted once and then run on any language (internationalization testing—i.e. English, Chinese, German, etc.). In addition, verification points (VP) can be extracted from an application under test (AUT). The baseline text (translations) can be displayed for review. The tester can then verify baseline translations, as will seen by an end user and or identify any missing baseline translations.

5 Claims, 6 Drawing Sheets

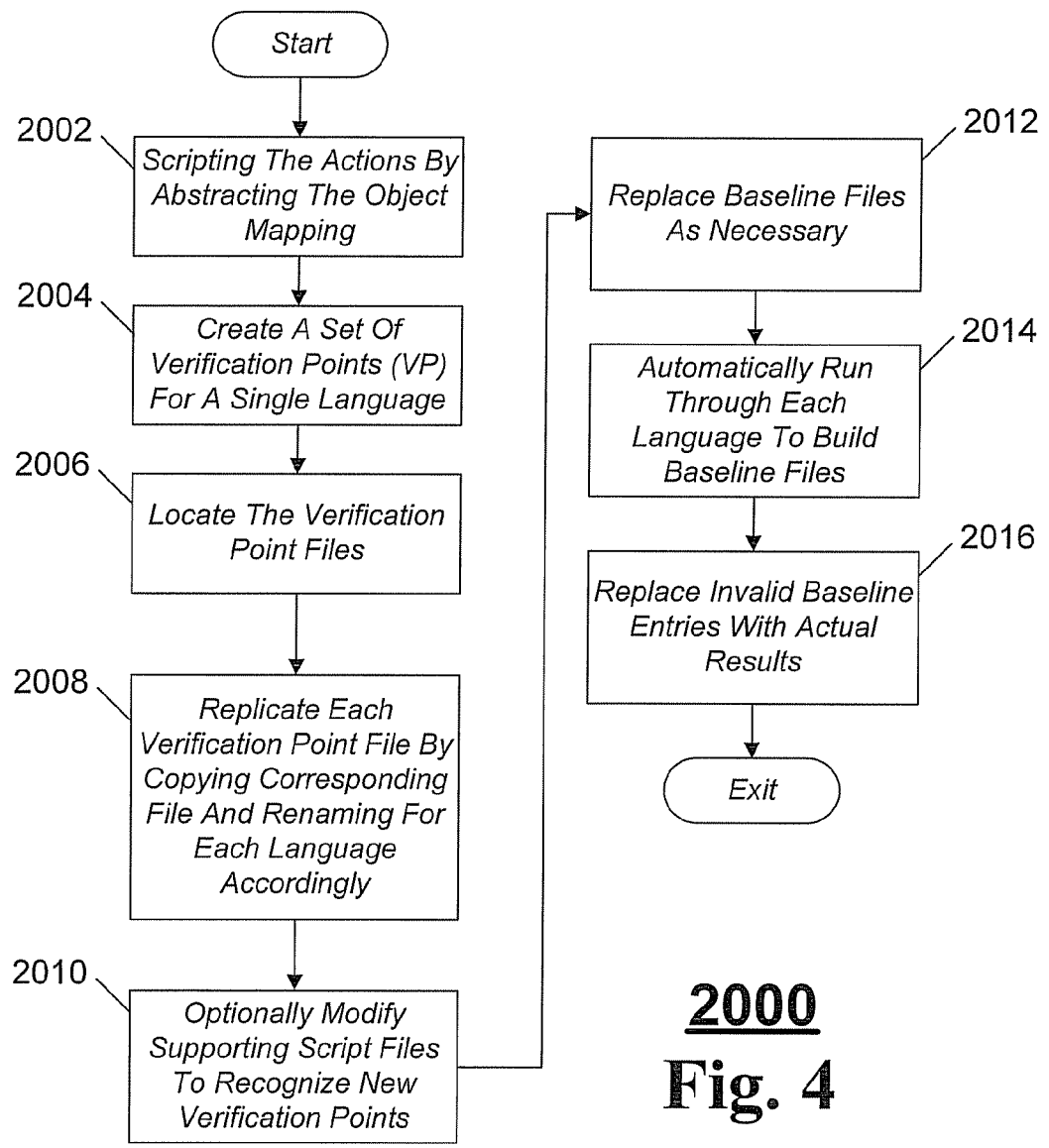

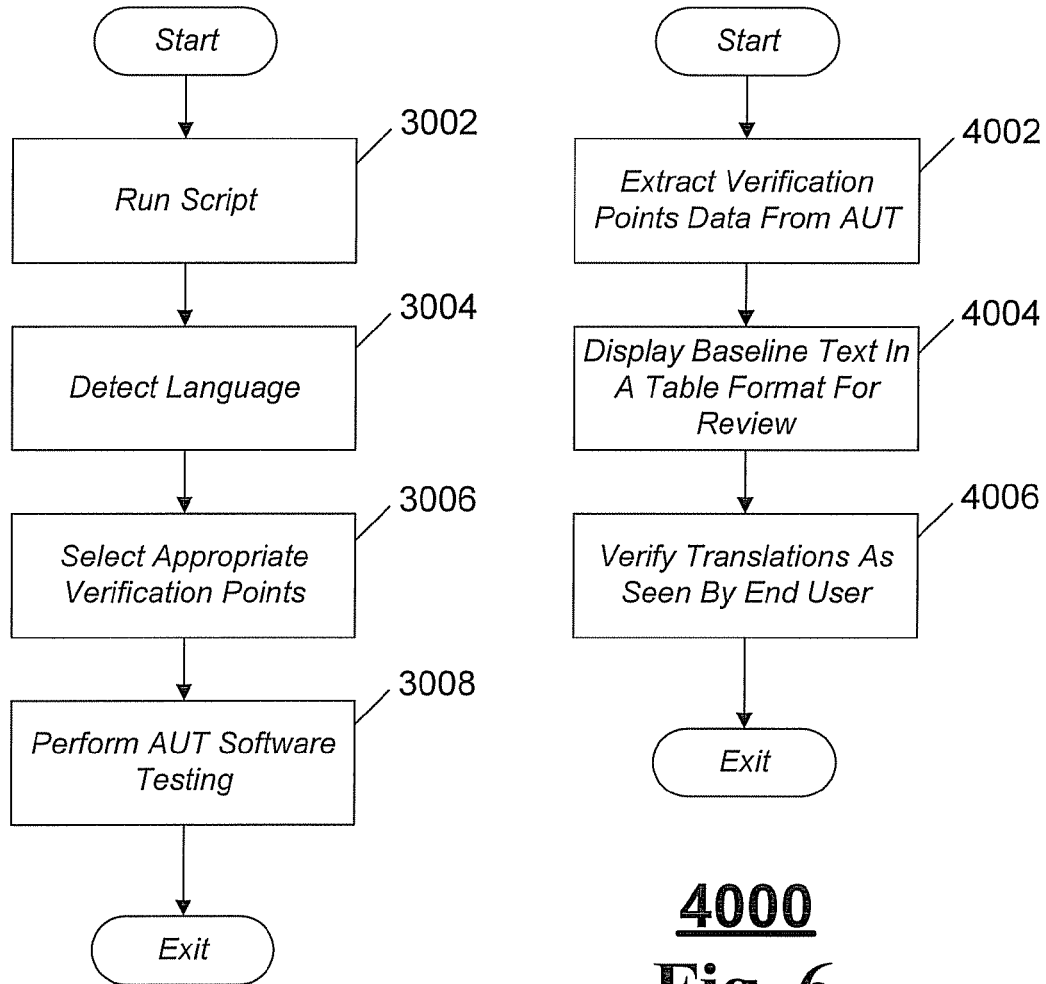

METHOD FOR AUTOMATING INTERNATIONALIZATION SOFTWARE TESTING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of The Invention

This invention relates to a method that provides for an effective way of creating and maintaining test scripts, and particularly to abstracting and mapping software objects from an application under test (AUT), creating verification points (VP), and scripting actions. In addition, verification points can be extracted from an application under test. The baseline text (translations) can be displayed for review. The tester can verify baseline translations, as will be seen by an end user, and or identify any missing baseline text (translations).

2. Description of Background

Before our invention a solution for automating internationalization software testing was through manually scripting each language. This process begins with the tester starting with one language and creating the script or scripts containing actions and verification points (VP) specific to that language. The script creation begins with manually navigating the application under test (AUT) to the desired state. During the navigation process, the automation tool records the actions performed with respect to the current language under test. Once the AUT is at the desired state, the tester would use the automation tool to create a VP. The tool would present a series of dialogs asking for the user to select one or more objects followed by which object properties to verify. This process of adding actions and VPs is repeated until the script meets all the requirements of the test. Once the first language is done, the same process is applied to all subsequent languages. The result is a separate script (with actions and associated VPs) for each language.

A major shortcoming of this approach is that it is not scalable. As the number of supported languages increase, the work involved grows dramatically. Since the actions are scripted per language, each language requires manual effort to create and maintain. The amount of work can be significant when testing many languages. Likewise, the problem is also present with respect to verification points. The effort involved when testing many languages is considerable when taking into account that each language requires manual creation of numerous verification points. In addition, the maintenance effort of the scripts can be burdensome. Especially when more languages are supported, and or when new features to test are added. For example, the addition of a new AUT feature would require the manual creation of the necessary actions and VPs for that feature across all of the supported languages. Likewise, in the case where the AUT supports a new language, an entirely new script will need to be manually created for the new language. The existing manual process does not scale well to either of these maintenance items. Another problem is that it can lead to inconsistencies. In particular, the consistency of VPs across languages is compromised due to the high probability of human error involved in the manual creation process.

SUMMARY OF THE INVENTION

The shortcomings of the prior art are overcome and additional advantages are provided through the provision of a method of automating internationalization of software testing, the method comprising abstracting a mapping of a plurality of software objects of an application under test (AUT); creating a set of verification points (VP) related to each of the plurality of software objects for a single language, the set of verification points having a plurality of identifiers associated with a plurality of baselines; creating a test script, the test script comprising scripting actions to test the application under test based in part on the set of verification points for the single language; replicating each of the set of verification points for the single language by copying and renaming in a plurality of language specific individual files the set of verification points for each of a plurality of languages; modifying, optionally the test script to support and or recognize a plurality of new verification points, and or a plurality of languages; running automatically the test script for each of the plurality of languages to build a plurality of language specific baseline files; replacing selectively entries in each of the plurality of language specific baseline files with a language specific baseline entry; and performing internationalization testing of the application under test by using the test script repeatedly in each of the plurality of languages.

Also shortcomings of the prior art are overcome and additional advantages are provided through the provision of a method of automating internationalization of software testing, said method comprising configuring an application under test (AUT) by selecting an end user language; running a test script to perform a software test on the application under test; detecting the end user language; selecting a set of language specific verification points based on the end user language, the set of language specific verification points having a plurality of identifiers associated with a plurality of baselines; and performing internationalization software testing of the application under test.

Also shortcomings of the prior art are overcome and additional advantages are provided through the provision of a method of automating internationalization of software testing, the method comprising extracting a plurality of identifiers and a plurality of baselines associated with a set of language specific verification points from an application under test (AUT); displaying the plurality of identifiers and the plurality of baselines; verifying the translation accuracy of the plurality of baselines; and identifying missing the plurality of baselines.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which improves the automation of internationalization software testing.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates one example of a routine for scripting actions and creating verification points for one language and then replicating to support other languages, FIG. 5 illustrates one example of a routine for running a test script, detecting a specific language, and then performing application under test (AUT) software testing for the specific language;

FIG. 6 illustrates one example of a routine for extracting verification points (VP) from an application under test (AUT), displaying the baseline text for review, and then verifying the baseline translations as will seen by an end user.

The detailed description explains the preferred embodiments of the invention, together with advantages and features, by way of example with reference to the drawings.

DETAILED DESCRIPTION OF THE INVENTION

Figure 1A:
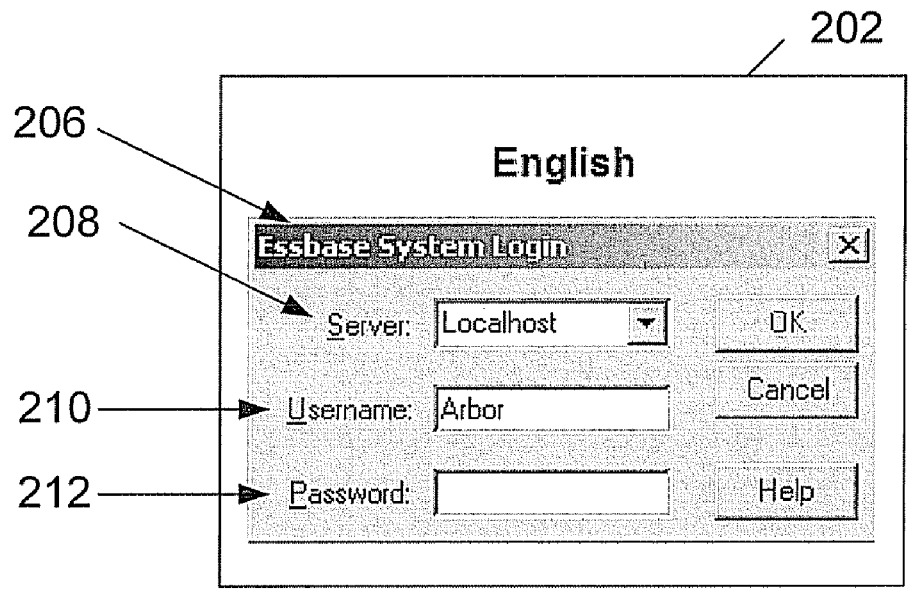
FIG. 1A illustrates one example of a dialog box with English language text prompts.
Figure 1B:
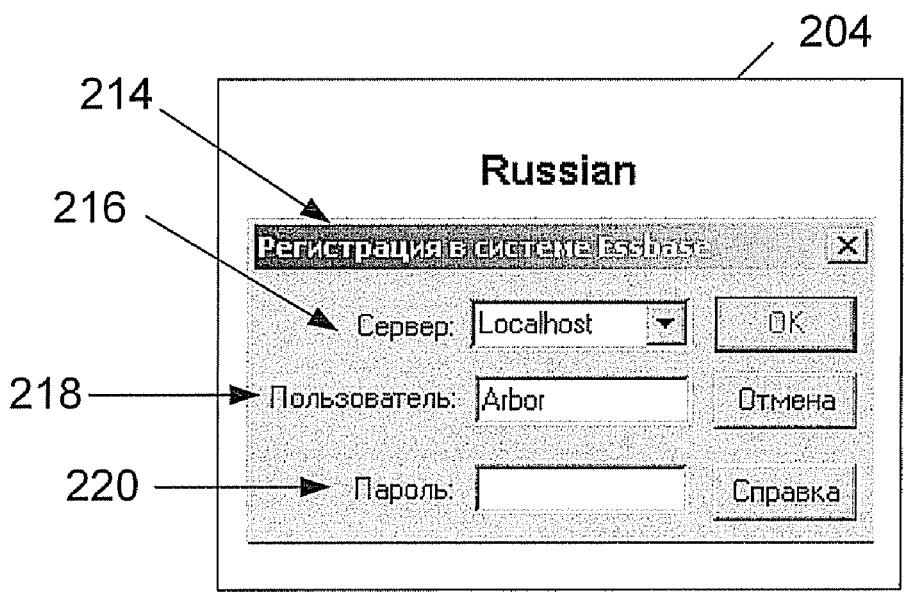
FIG. 1B illustrates one example of a dialog box with Russian language text prompts.

Turning now to the drawings in greater detail, it will be seen that in FIG. 1A there is illustrated one example of a dialog box with English language text prompts, and in FIG. 1B there is illustrated one example of a dialog box with Russian language text prompts.

In prior art software testing methods the consistency of verification points (VP) across languages can be compromised due to the high probability of human error involved in the manual creation process. In particular, the consistency of VP property identifiers across languages is compromised due to the high probability of human error involved in the manual creation process.

In contrast, embodiments of the present invention results in having each set of VPs per language identify the same properties for verification. The only differences in the VPs across languages are the baselines. The baselines should reflect what is considered correct for each respective language.

Furthermore, in prior art methods of software testing, since all the actions for each language are scripted separately, the tester may run into consistency problems across test scripts. Some test scripts may perform additional actions and others may be overlooked.

In contrast, embodiments of the present invention automate internationalization software testing providing a much more effective way of creating and maintaining test scripts.

Referring to FIG. 1A-1B, automating internationalization software testing begins with scripting the actions. In and exemplary embodiment, a mapping to objects in an abstracted fashion is performed. In this regard, the tester only needs to write the actions once. The test script can then be run on any language. This can save a significant amount of time considering prior art methods require the tester to script actions for each language individually. In addition, any maintenance including modification or addition of actions is centralized in one script verse an enormous collection of similar scripts.

Mappings can be done and action scripts can be written so it is language independent of the application under test (AUT). Automation tools often have different criteria on how objects in the script are mapped to the actual object in the AUT. In an exemplary embodiment, an objective in internationalization testing is to make this mapping independent of the languages. For instance, in FIG. 1A-1B the same dialog is shown for the English dialog box 202, and in Russian dialog box 204. In this regard, caption name 206 corresponds to caption name 214, and text 208, 210, and 212 correspond to text 216, 218, and 220 respectively.

In many prior art methods the dialog box of interest is identified by its caption name 206 or 214, which from language to language can be different. In this case:

"Caption=Essbase System Login". In English; and

"Caption=Per . . . ". In Russian.

In contrast, in an exemplary embodiment of the present invention the dialog box of interest is identified based on its underlying class name as follows:

"Class=essMDIeSSbase"

Using the underlying class name is equivalent from the standpoint of being able to uniquely identify the dialog box. However, unlike using the caption name the underlying class name remains constant across the different languages. As such, this method of using underlying class names in the scripting of the test script can be referred to as 'script the actions once, and run on any language'.

Figure 2:
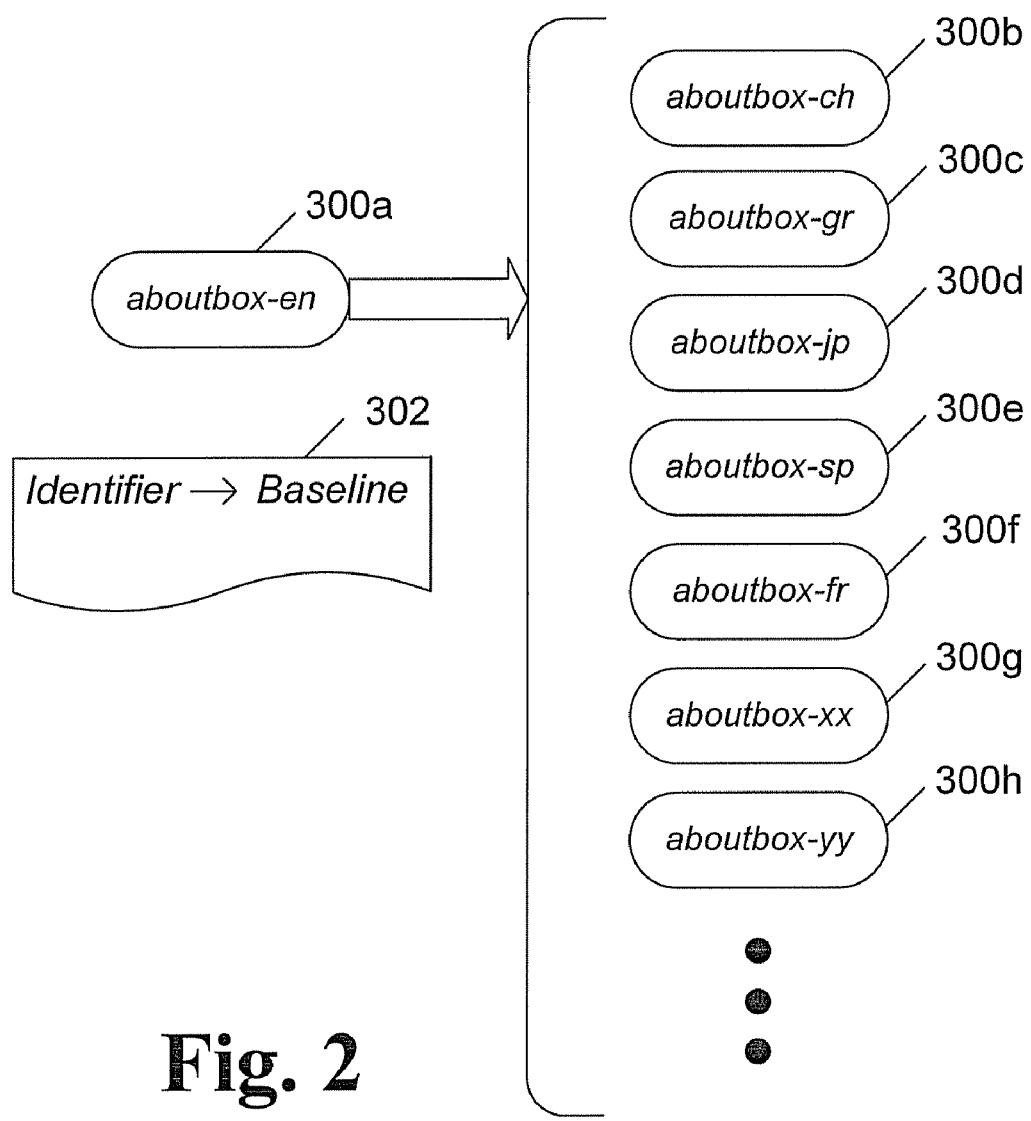
FIG. 2 illustrates one example of replicating verification point files for various languages.

In an exemplary embodiment, after the actions are complete, all required verification points (VP) must be identified and created in the test script. In general, verification points are essentially made up of two parts an 'identifier' component, which specifies what objects and properties to verify and a 'baseline' (text prompt, caption, etc.) component that contains the expected values. These two parts usually equate to one or more files. FIG. 2 illustrates the 'identifier' and 'baseline' relationship as file 302.

In an exemplary embodiment, the verification points are created for a single language. After the set VPs is created, checked, and verified for a single language, the set is then used to derive the VPs for all of the other languages. Since the resulting VPs for each language are derived from a single set of VPs, the baselines may need to be replaced to reflect each respective language. Executing the script on each language and replacing the baseline with results recorded during the execution accomplish this. The method can save the tester a substantial amount of time by not having to repeatedly navigate the AUT to a particular state and using the automation tool to select properties for each verification point in every language. Similarly, the maintenance effort is also substantially decreased. The addition of a new VP would only require creating that VP once for a single language, and then deriving all of the others from it and replacing the baselines accordingly.

Referring to FIG. 2 there is illustrated one example of replicating verification point files for various languages. Once the files are identified, copying its corresponding files and renaming them accordingly replicates each verification point. As an example and not limitation, an initial verification point named 'aboutbox-en' 300a is replicated by making a copy of it and changing the two-letter identifier for every supported language. An example of a replicated verification point for Japanese is 'aboutbox-jp' 300d. FIG. 2 also illustrates replication 'aboutbox-ch' 300b Chinese, 'aboutbox-gr'

300c German, 'aboutbox-sp' 300e Spanish, 'aboutbox-fr' 300f French, and into other languages 'aboutbox-xx' 300g, and 'aboutbox-yy' 300h.

In some cases additional modifications to supporting script files is needed to recognize the new verification points. This usually involves a find/replace operation on the original name and the new name. In addition, scripts might also need to be supplemented with code that allows it to be aware of the current language being tested and as such baselines entries can be changed as necessary.

In an exemplary embodiment, since all verification point files (identifier and baseline) have been copied, we know that the identifier files are complete and consistent with respect to the original. The remaining task is replacing the baseline files with valid ones. Since the actions are complete, all that is required is an automated run through in each language. Finally, invalid baselines need to be replaced with the actual results upon reviewing the execution logs. Now when the script runs, the generic test script will detect the language and select the appropriate VPs from which to verify. For example, if the current language is German, the script will use the German verification points.

Figure 3:
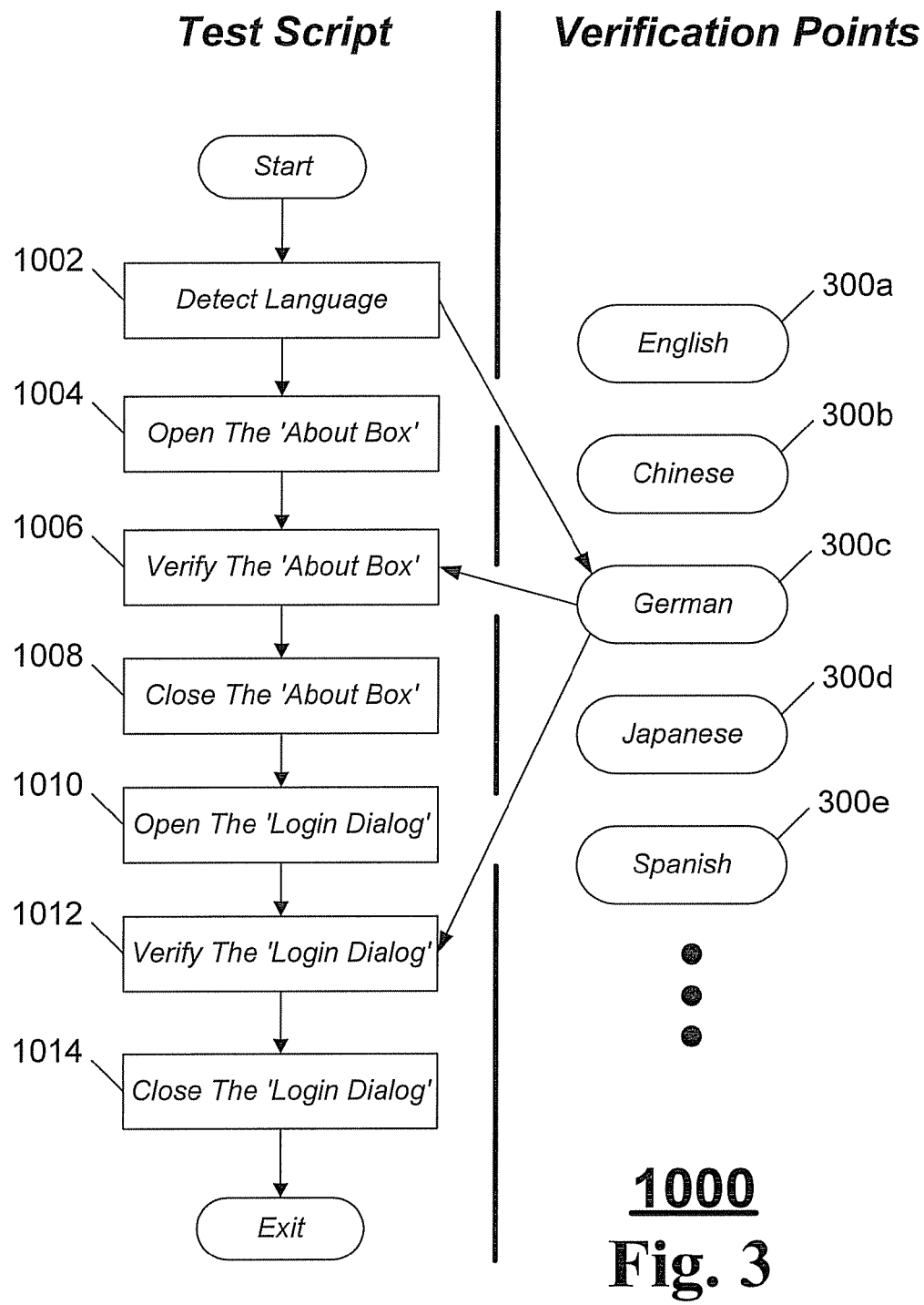
FIG. 3 illustrates one example of interaction between a test script and a language specific verification point file.

Referring to FIG. 3 there is illustrated one example of interaction between a test script and a language specific verification point file. In an exemplary embodiment, at this point, the result is a single test script that can run on any language. The test script is aware of the current language under test and selects the appropriate set of verification points when asked to verify. Processing begins in block 1002.

In block 1002 the current language is detected. In this exemplary embodiment, the German verification points 300c are used in the AUT software testing. Processing then moves to block 1004.

In block 1004 the application under test (AUT) 'About Box' is opened. Processing then moves to block 1006.

In block 1006 the 'About Box' is tested with the German verification points 300c. Processing then moves to block 1008.

In block 1008 the 'About Box' is closed and processing then moves to block 1010.

In block 1010 the application tinder test (AUT) 'Logon Dialog' is opened. Processing then moves to block 1012.

In block 1012 the 'Logon Dialog' is tested with the German verification points 300c. Processing then moves to block 1014.

In block 1014 the 'Logon Dialog' is closed and the routine is exited.

In an exemplary embodiment, the consistency problem involving actions is solved since the same actions in the script are run on every language. Likewise, the consistency problem regarding verification points is also solved since all VPs are derived from the initial set of VPs that is known to be correct and complete. The issue of adding support for another language simply involves replication from an existing set of VPs to the new language. Adding support for testing a new feature of the AUT only requires adding the actions to the generic test script followed by the creation and replication of any new verification points.

Referring to FIG. 4 there is illustrated one example of a routine 2000 for scripting actions and creating verification points for one language and then replicating to support other languages. In an exemplary embodiment, in developing testing scripts and preparing for internationalization software testing a mapping to objects in an abstracted fashion is performed. In this regard, the tester only needs to write the actions once. The test script can then be run on any language. Then all required verification points must be identified and created in the test script. The verification point files are then replicated for various languages. Once the files are identified, copying its corresponding files and renaming them accordingly replicates each verification point. In some cases additional modification to supporting script files is needed to recognize the new verification points. This usually involves a find/replace operation on the original name and the new name. In addition, scripts might also need to be supplemented with code that allows it to be aware of the current language being tested and baseline entries can be changed as necessary. Processing begins in block 2002.

In block 2002 preparation for internationalization software testing is accomplished by a mapping to objects in an abstracted fashion. In an exemplary embodiment, the underlying class name of the object can be used. Processing then moves to block 2004.

In block 2004 all required verification points must be identified and created in the test script. The verification points (VP) are created for a single language. Processing then moves to block 2006.

In block 2006 the location of the verification point files is determined. Processing then moves to block 2008.

In block 2008 the verification point files are then replicated for various languages using the VPs created for the single language. In this regard, files are identified, copied, and renamed accordingly to replicate each verification point. Processing then moves to block 2010.

In block 2010 optionally modifications to supporting script files may be needed to recognize the new verification points. This usually involves a find/replace operation on the original name and the new name. Processing then moves to block 2012.

In block 2012, since the resulting VPs for each language are derived from a single set of VPs, the baselines may need to be replaced to reflect each respective language. Processing then moves to block 2014.

In block 2014 executing the script on each language builds the language specific baseline files. Processing then moves to block 2016.

In block 2016 baseline entries are then replaced with results recorded during the execution. The routine is then exited.

Referring to FIG. 5 there is illustrated one example a routine 3000 for running a test script, detecting a specific language, and then performing application under test (AUT) software testing for the specific language. Processing begins in block 3002.

In block 3002 the testing script is executed. Processing then moves to block 3004.

In block 3004 the AUT testing language is detected. Processing then moves to block 3006.

In block 3006 the appropriate verification points are selected based in part on the language detected in block 3004. Processing then moves to block 3008.

In block 3008 the software testing of the application under test (AUT) is performed. The routine is then exited.

Referring to FIG. 6 there is illustrated one example of a routine for extracting translated text from an application under test (AUT), displaying the actual text for review, and then verifying the actual translations as will seen by an end user. In an exemplary embodiment routine 4000 can be utilized to extract the actual data from the AUT and display the results. In this regard, the tester can verify that the actual data (i.e., text prompts, captions, etc.) also referred to, as translations are correct. Processing begins in block 4002.

In block 4002 the verification point actual data is extracted from the AUT. Such extraction can be for a single language or for a plurality of languages. Processing then moves to block 4004.

In block 4004 the extracted verification point (VP) actual data (the translations) (i.e. text prompts, captions, etc.) are displayed in a table, grid or other convenient format. Processing then moves to block 4006.

In block 4006 the actual data also referred to as the translations as will be seen by the end user of the AUT can be verified by the tester. The routine is then exited.

Figure 7:
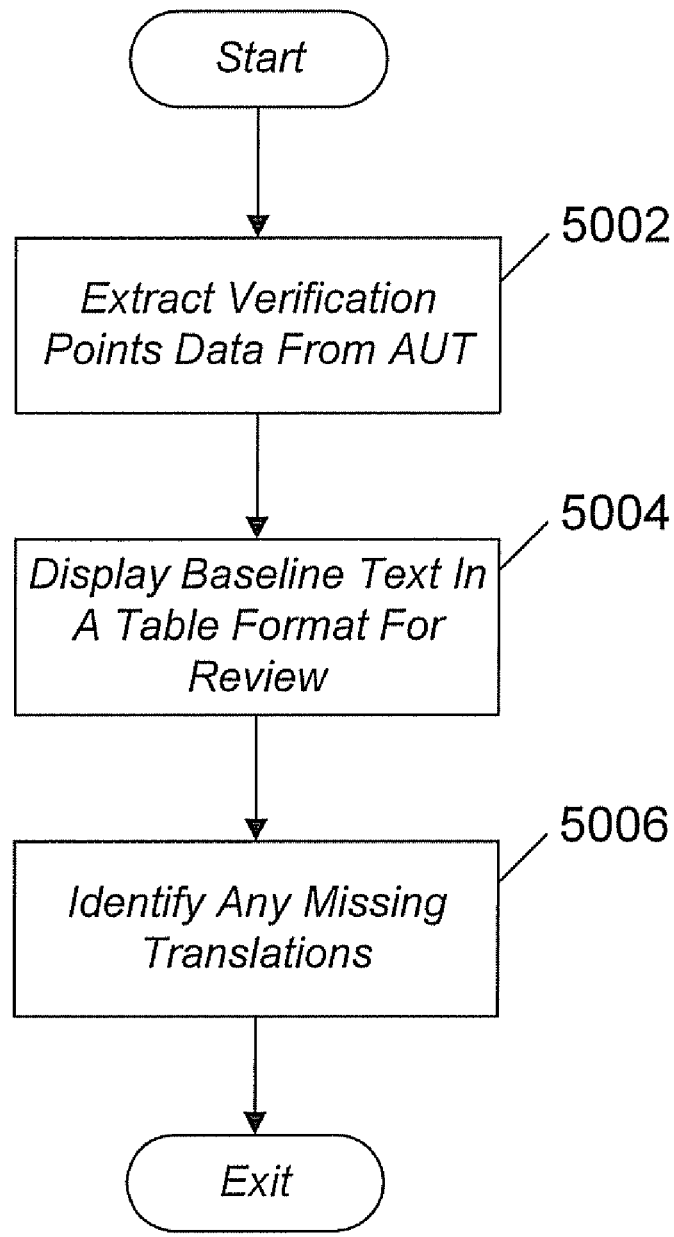
FIG. 7 illustrates one example of a routine for extracting verification points (VP) from an application under test (AUT), displaying the baseline text for review, and then identifying any missing baseline translations.

Referring to FIG. 7 there is illustrated one example of a routine for extracting verification point (VP) actual data from an application under test (AUT), displaying it for review, and then identifying any missing translations. In an exemplary embodiment routine 5000 can be utilized to extract the actual data from the AUT and display the results. In this regard, the tester can identify any missing baseline entries (i.e. text prompts, captions, etc.) also referred to as translations. Processing begins in block 5002.

In block 5002 the verification point actual data is extracted from the AUT. Such extraction can be for a single language or for a plurality of languages. Processing then moves to block 5004.

In block 5004 the extracted verification point (VP) actual data (the translations) (i.e. text prompts, captions, etc.) are displayed in a table, grid or other convenient format. Processing then moves to block 5006.

In block 5006 the actual data also referred to as the translations as will be seen by the end user of the AUT can be inspected by the tester to determine if any of the translations are missing. The routine is then exited.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of automating internationalization of software testing, said method comprising:
    abstracting a mapping of a plurality of software objects of an application under test (AUT);
    creating a set of verification points (VP) related to each of said plurality of software objects for a single language, said set of verification points having a plurality of identifiers associated with a plurality of baselines, the verification points including a plurality of identifiers specifying properties to verify and a plurality of baselines that contain the expected value of the properties;
    creating a test script, said test script comprising scripting actions to test said application under test based in part on said set of verification points for said single language;
    replicating each of said set of verification points for said single language by copying and renaming in a plurality of language specific individual files of said set of verification points for each of a plurality of languages;
    modifying, said test script to support and or recognize a plurality of new verification points, and or a plurality of languages;
    running automatically said test script for each of said plurality of languages to build a plurality of language specific baseline files;
    replacing selectively entries in each of said plurality of language specific baseline files with a language specific baseline entry; and
    performing internationalization testing of said application under test by using said test script repeatedly in each of said plurality of languages.

2. The method in accordance with claim 1, further comprising:
    extracting said plurality of identifiers and or said plurality of baselines associated with said set of verification points from said application under test.

3. The method in accordance with claim 2, further comprising:
    displaying said plurality of identifiers and or said plurality of baselines.

4. The method in accordance with claim 3, further comprising:
    verifying a translation accuracy of said plurality of baselines and or said language specific baseline entry.

5. The method in accordance with claim 3, further comprising:
    identifying missing said plurality of baselines and or said language specific baseline entry.

* * * * *